United States Patent [19]

Kamke

[11] Patent Number: 5,493,198
[45] Date of Patent: Feb. 20, 1996

[54] APPARATUS AND METHOD FOR MAINTAINING THE CHARGE OF A BATTERY

[75] Inventor: James E. Kamke, Libertyville, Ill.

[73] Assignee: Motorola, Inc., Schaumburg, Ill.

[21] Appl. No.: 242,754

[22] Filed: May 13, 1994

[51] Int. Cl.⁶ .................................. H01M 10/44
[52] U.S. Cl. ..................... 320/23; 320/35; 320/37
[58] Field of Search ......................... 320/22, 23, 24, 320/31, 32, 35, 36, 37, 38, 20

[56] References Cited

U.S. PATENT DOCUMENTS

| | | | |
|---|---|---|---|
| 3,740,636 | 6/1973 | Hogrefe et al. | 320/35 |
| 3,852,652 | 12/1974 | Jasinski | 320/35 |
| 4,392,101 | 7/1983 | Saar et al. | 320/20 |
| 4,503,378 | 3/1985 | Jones et al. | 320/20 |
| 4,554,500 | 11/1985 | Sokira | 320/31 |
| 4,755,735 | 7/1988 | Inakagata | 320/35 |
| 4,806,840 | 2/1989 | Alexander et al. | 320/20 |
| 5,200,690 | 4/1993 | Uchida | 320/20 |
| 5,289,103 | 2/1994 | Eccleston | 320/32 |
| 5,302,887 | 4/1994 | Ishiguro et al. | 320/32 |
| 5,331,268 | 7/1994 | Patino et al. | 320/20 |

Primary Examiner—Peter S. Wong
Assistant Examiner—Edward Tso
Attorney, Agent, or Firm—Donald C. Kordich

[57] ABSTRACT

A battery charger (10) and associated method for maintaining the charge of a battery (12). The battery charger (10) has a processor (16), power supply (14) and power regulator (15). The battery charger (10) first applies a high current charge to the battery (12), which is terminated when the battery voltage or temperature reaches a defined limit. Then the battery charger (10) applies a low current charge (102) for a set period of time. Next, no charge is applied until the battery (12) cools to an ambient temperature. The ambient temperature is then measured using a thermistor (18) in the battery (12). If the ambient temperature is above a certain threshold no charge is applied for a wait period. If the ambient temperature is below the threshold the low current charge is applied for a the set period of time.

3 Claims, 1 Drawing Sheet

APPARATUS AND METHOD FOR MAINTAINING THE CHARGE OF A BATTERY

FIELD OF THE INVENTION

The present invention relates generally to the field of battery charging, and more particularly to, maintaining the charge of a battery.

BACKGROUND OF THE INVENTION

The increasing use of portable communication devices with newer rechargeable batteries has created a need for improved battery chargers. Examples of such communication devices are radiotelephones, radios, and modems. A typical battery charger charges at a high current rate until the battery is almost charged then reduces the charge rate to a low maintenance or trickle charge. It is important that the battery charger change from the high current rate to the trickle rate at the appropriate time or the battery's cycle life can be reduced. The change over time is usually determined by monitoring the battery temperature.

The new metal nickel hydride (NiMH) batteries will typically lose their charge over an extended period of time, even without use. Typically, the trickle charge is used to keep the battery fully charged until it is used. However, the manufacturers of NiMH batteries have suggested that the use of a trickle charge will reduce the battery's cycle life. Thus, there exists a need for an apparatus and method to maintain the charge of NiMH batteries without reducing the battery cycle life.

DETAILED DESCRIPTION OF THE DRAWINGS

Figure 1:
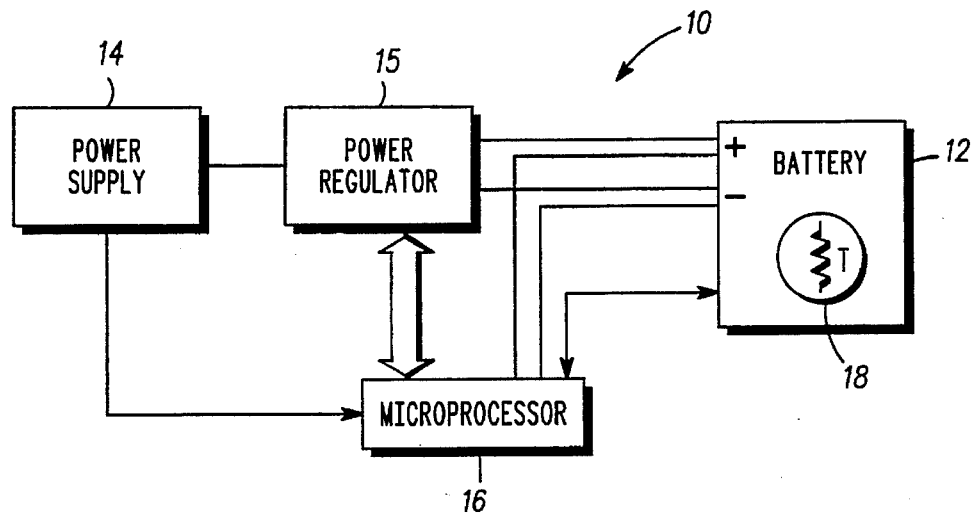
FIG. 1 is a schematic diagram of a battery charger with a battery.

FIG. 1 is a simplified schematic of a battery charger 10 and a battery 12. The battery charger 10 could be of the stand alone variety or could be internal to a device such as a cellular telephone. The battery charger 10 has a power supply 14 and a power regulator 15 for supplying a charging current to the battery 12. The power regulator 15 also supplies regulated power to a microprocessor 16. The microprocessor 16 controls the charging current supplied to the battery 12 from the power supply 14 through the power regulator 15. The microprocessor 16 monitors the battery's 12 temperature or voltage to determine the right amount of charging current to apply to the battery 12. The battery 12 has a built in thermistor 18 that the microprocessor 16 uses to determine the battery temperature.

The battery charger 10 has a plurality of charging modes. A fast charge mode is used to recharge the battery. The microprocessor 16 initiates the fast charging mode by sending a start signal to the power regulator 15. During the fast charge mode a large charging current is applied to the battery. This current is around one ampere for large batteries. If the fast charge mode is applied for too long it can reduce the battery cycle life. In order to avoid this the battery charger 10 can use a variety of methods to determine when to terminate the fast charge mode. One method involves determining if the battery temperature exceeds a certain limit and terminating the fast charge mode when the limit is exceeded. Another method has been to monitor the change in the battery temperature over a set time period. If the battery temperature rises more than a set amount the fast charge mode is terminated. The microprocessor 16 monitors the battery temperature or battery voltage using one of these methods and determines when the battery 12 is fully charged. When the battery 12 is fully charged the microprocessor 16 sends a stop signal to the power regulator 15 and the charging current is turned off.

Once the fast charge mode is terminated a trickle charge mode is employed to insure the battery stays fully charged until it is used. The microprocessor starts the trickle charge by sending a maintenance charge signal to the power regulator 15. The trickle charge mode uses low currents of approximately eighteen milliamperes. The trickle charge mode is necessary for NiMH batteries because they typically lose their charge over an extended time, even without use. Unfortunately, the manufactures of NiMH batteries suggest that NiMH batteries not be trickle charged because it reduces the battery cycle life. Using the apparatus and method described herein allows the battery to be trickle charged without reducing the battery cycle life. The invention involves an apparatus and method for checking the ambient temperature while the battery is in the trickle charge mode and only charging when the ambient temperature is below a certain threshold. The microprocessor 16 stops the trickle charge until the ambient temperature is below the threshold by sending a pause signal to the power regulator 15.

Figure 2:
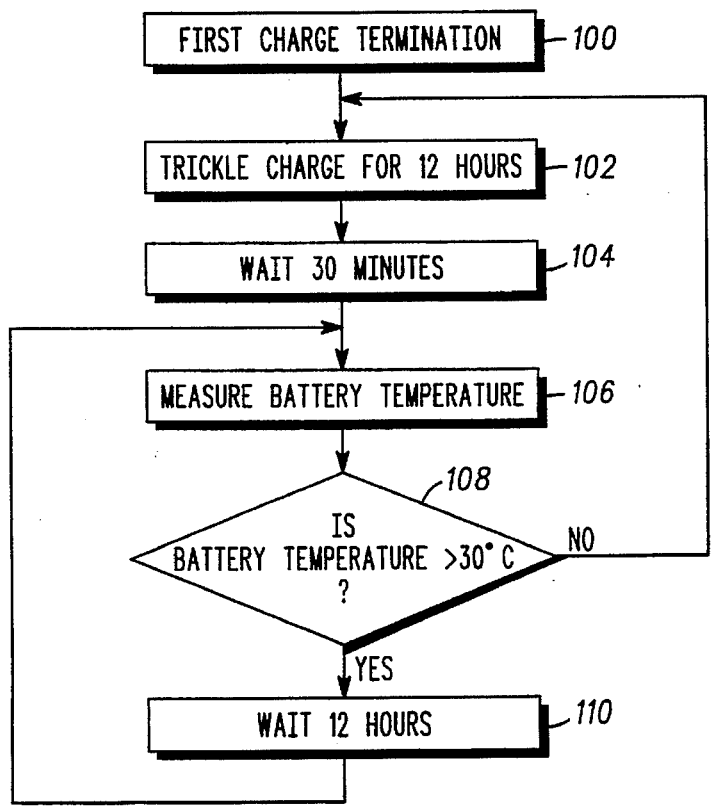
FIG. 2 is a flowchart of a process for maintaining the charge of a battery.

FIG. 2 is a flow chart of the algorithm the microprocessor 16 employs to trickle charge the battery 12 without reducing the battery cycle life. In block 100 the fast charge has been terminated according to a set criteria such as those discussed earlier. The trickle charge is then applied to the battery 12 for a period of twelve hours, as shown in block 102. Next, no charge is applied to the battery 12 for a period of thirty minutes, as shown in block 104. This allows the battery enough time to cool to ambient temperature. Then the battery 12 temperature is measured, in block 106, which will also be the ambient temperature. In block 108, the battery temperature is compared against a threshold, which is shown as 30° C. in FIG. 2. While 30° C. has been chosen for illustration purposes it is believed that any temperature up to 45° C. can be used. If the battery temperature is above 30° C., then no charge is applied to the battery for twelve hours as shown in block 110. From block 110 the algorithm branches to block 106 where the battery temperature is measured again. If the battery temperature in block 108 is not above 30° C. then the algorithm branches to block 102 and the trickle charge is applied for twelve hours.

The time periods chosen in FIG. 2 can be varied without significantly affecting the performance of the invention. The trickle charge period of twelve hours could be lengthened to say fourteen hours. However longer periods risk trickle charging the battery when the ambient temperature is above the threshold temperature and reducing the battery's cycle life. The trickle charge period could be reduce to say two hours, this results in having the battery not being charged as much since the battery must cool to ambient temperature before the temperature can be tested and this cooling period is essentially independent of the trickle charge time period.

The wait time period, in block 104, of thirty minutes was chosen to be the minimum amount of time necessary to insure the battery has cooled to ambient temperature. Obviously this time could be increased but this will decrease the time the battery is being trickle charged and increase the chance the battery will not be fully charged when needed.

The wait period, in block 110, can also be varied from no wait to fourteen or more hours. If the wait period is significantly reduced it just results in the battery temperature being sampled more often. Waiting longer periods can mean the battery is not being trickle charged when it could be without reducing the battery's cycle time.

An apparatus and method for maintaining the charge of a NiMH battery has been described which does not reduce the battery's cycle life. This is accomplished by a battery charger having a microprocessor which executes a process that only trickle charges a battery when the ambient temperature is below a threshold level.

What is claimed is:

1. An apparatus for maintaining the charge of a battery comprising:

a power supply;

a regulator means coupled to the power supply for regulating the current to the battery; and a processor means coupled to said regulator means for controlling the regulator means, the processor means having two modes, a first mode for charging the battery and a second mode for maintaining the charge of the battery by applying a maintenance charge from the regulator means to the battery based upon an ambient temperature, wherein the battery contains a thermistor and the maintenance charge is turned off for a predetermined period of time before the thermistor temperature is sampled, whereby the thermistor's temperature is at ambient temperature.

2. The apparatus of claim 1 wherein the maintenance charge is only applied to the battery if the ambient temperature is below a predetermined temperature.

3. The apparatus of claim 1 wherein the battery to be charged is a NiMH battery.

* * * * *

UNITED STATES PATENT AND TRADEMARK OFFICE
CERTIFICATE OF CORRECTION

PATENT NO. : 5,493,198
DATED : February 20, 1996
INVENTOR(S) : Kamke, James F.

It is certified that error appears in the above-indentified patent and that said Letters Patent is hereby corrected as shown below:

On the title page, item [75],
Under "Inventor" information, please change the inventor's middle initial from "E." to --F.--.

Signed and Sealed this

Second Day of July, 1996

Attest:

BRUCE LEHMAN

*Attesting Officer*      *Commissioner of Patents and Trademarks*